(12) United States Patent
Takemoto et al.

(10) Patent No.: US 10,873,238 B2
(45) Date of Patent: Dec. 22, 2020

(54) MOTOR

(71) Applicant: Nidec Corporation, Kyoto (JP)

(72) Inventors: Shinji Takemoto, Kyoto (JP); Keizo Furukawa, Kyoto (JP); Tsuyoshi Hirokawa, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

(21) Appl. No.: 16/448,082

(22) Filed: Jun. 21, 2019

(65) Prior Publication Data

US 2020/0067373 A1    Feb. 27, 2020

(30) Foreign Application Priority Data

Aug. 22, 2018  (JP) ................. 2018-155573

(51) Int. Cl.
| | | |
|---|---|---|
| H02K 5/173 | (2006.01) | |
| H02K 1/14 | (2006.01) | |
| H02K 21/22 | (2006.01) | |
| H02K 5/16 | (2006.01) | |
| H02K 3/38 | (2006.01) | |
| H02K 7/08 | (2006.01) | |
| H02K 3/52 | (2006.01) | |

(52) U.S. Cl.
CPC ........... *H02K 5/1735* (2013.01); *H02K 1/146* (2013.01); *H02K 3/38* (2013.01); *H02K 3/522* (2013.01); *H02K 7/085* (2013.01); *H02K 21/22* (2013.01); *H02K 2203/03* (2013.01)

(58) Field of Classification Search
CPC ........ H02K 5/1735; H02K 1/146; H02K 3/38; H02K 7/085; H02K 21/22; H02K 3/522; H02K 2203/03; H02K 3/325; H02K 1/2786; H02K 5/225; H02K 1/14; H02K 11/33; H02K 5/16; H02K 3/32; H02K 3/34; H02K 3/345; H02K 3/30; H02K 5/165; H02K 5/15

See application file for complete search history.

(56) References Cited

U.S. PATENT DOCUMENTS

| | | | |
|---|---|---|---|
| 6,242,830 B1 | 6/2001 | Katagiri | |
| 2013/0236340 A1* | 9/2013 | Kawano | ................. F04B 17/03 417/420 |
| 2019/0199172 A1* | 6/2019 | Yoshino | ................. H02K 5/08 |

FOREIGN PATENT DOCUMENTS

| | | |
|---|---|---|
| JP | 10-336941 A | 12/1998 |
| JP | 2011-067084 A | 3/2011 |

\* cited by examiner

*Primary Examiner* — Thomas Truong
(74) *Attorney, Agent, or Firm* — Keating & Bennett

(57) ABSTRACT

A motor includes a stationary portion, a rotating portion that includes a shaft rotating about a vertically extending central axis, and a bearing portion that rotatably supports the shaft with respect to the stationary portion. The stationary portion includes a cylindrical bearing housing portion that holds the bearing portion, a stator that is radially outward of the bearing housing portion, a circuit board that is below the stator, and an annular spacer that is between the stator and the bearing housing portion. The stator includes a stator core that includes an annular core back and multiple teeth that extend radially outward from the core back and are arranged in a circumferential direction, an insulating film that covers a surface of the teeth, extends radially inward from a lower surface of the teeth, and covers a lower outer edge portion of the core back, and a coil provided on the teeth.

11 Claims, 9 Drawing Sheets

MOTOR

CROSS REFERENCE TO RELATED APPLICATION

The present disclosure claims priority under 35 U.S.C. § 119 to Japanese Application No. 2018-155573 filed on Aug. 22, 2018 the entire contents of which are incorporated herein by reference.

1. FIELD OF THE INVENTION

The present disclosure relates to a motor.

2. BACKGROUND

A conventional motor includes a stator having a stator core, a rotor having a rotating shaft, and a bearing holder (bearing housing portion). The stator core is fixed to the bearing holder.

A magnetic pole is provided radially outward of the stator core. A coil is formed by winding a conductor wire around the magnetic pole with an insulating member interposed therebetween. The insulating member is formed on the surface of the magnetic pole and also on a lower outer edge portion of the stator core.

However, in the motor described above, since the coil is formed by using the insulating member, the axial length of the stator becomes long. On the other hand, if the insulating member is changed to an insulating film to reduce the axial length of the stator, the film thickness of the insulating film varies since the insulating film is formed by coating. For this reason, when fixing a stator core and a bearing holder, the stator core and the bearing holder may come into contact with each other in the axial direction through the insulating film. In this case, there is a problem that the stator core and the bearing holder cannot be fixed firmly.

SUMMARY

Example embodiments of the present invention provide motors in each of which a stator core and a bearing housing portion are able to be fixed firmly.

An example embodiment of a motor of the present disclosure includes a stationary portion, a rotating portion that includes a shaft rotating about a vertically extending central axis, and a bearing portion that rotatably supports the shaft with respect to the stationary portion. The stationary portion includes a cylindrical bearing housing portion that holds the bearing portion, a stator that is radially outward of the bearing housing portion, a circuit board that is below the stator, and an annular spacer that is between the stator and the bearing housing portion. The stator includes a stator core that includes an annular core back and multiple teeth that extend radially outward from the core back and are arranged in a circumferential direction, an insulating film that covers a surface of the teeth, extends radially inward from a lower surface of the teeth, and covers a lower outer edge portion of the core back, and a coil provided on the teeth. The spacer includes multiple side wall portions that contact a radially inner surface of the stator core and a radially outer surface of the bearing housing portion, and a flange portion that protrudes radially outward more than the side wall portion, and contacts a lower inner edge portion of the core back while avoiding the insulating film.

According to the example embodiment of the present disclosure, it is possible to provide a motor in which a stator core and a bearing housing portion can be fixed firmly.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present application will be described with reference to the drawings. In addition, in the present application, a direction parallel to the central axis of a motor is referred to as an "axial direction", a direction orthogonal to the central axis of the motor is referred to as a "radial direction", and a direction along a circular arc centered on the central axis of the motor is referred to as a "circumferential direction". In addition, in the present application, the shapes and positional relationships of parts will be described assuming that the axial direction is a vertical direction, and a stator core side of a base portion is an upper side. Note that the vertical direction is simply a name used for explanation, and does not limit the actual positional relationship and direction.

In addition, a "parallel direction" in the present application includes a substantially parallel direction. In addition, an "orthogonal direction" in the present application includes a substantially orthogonal direction.

Figure 1:
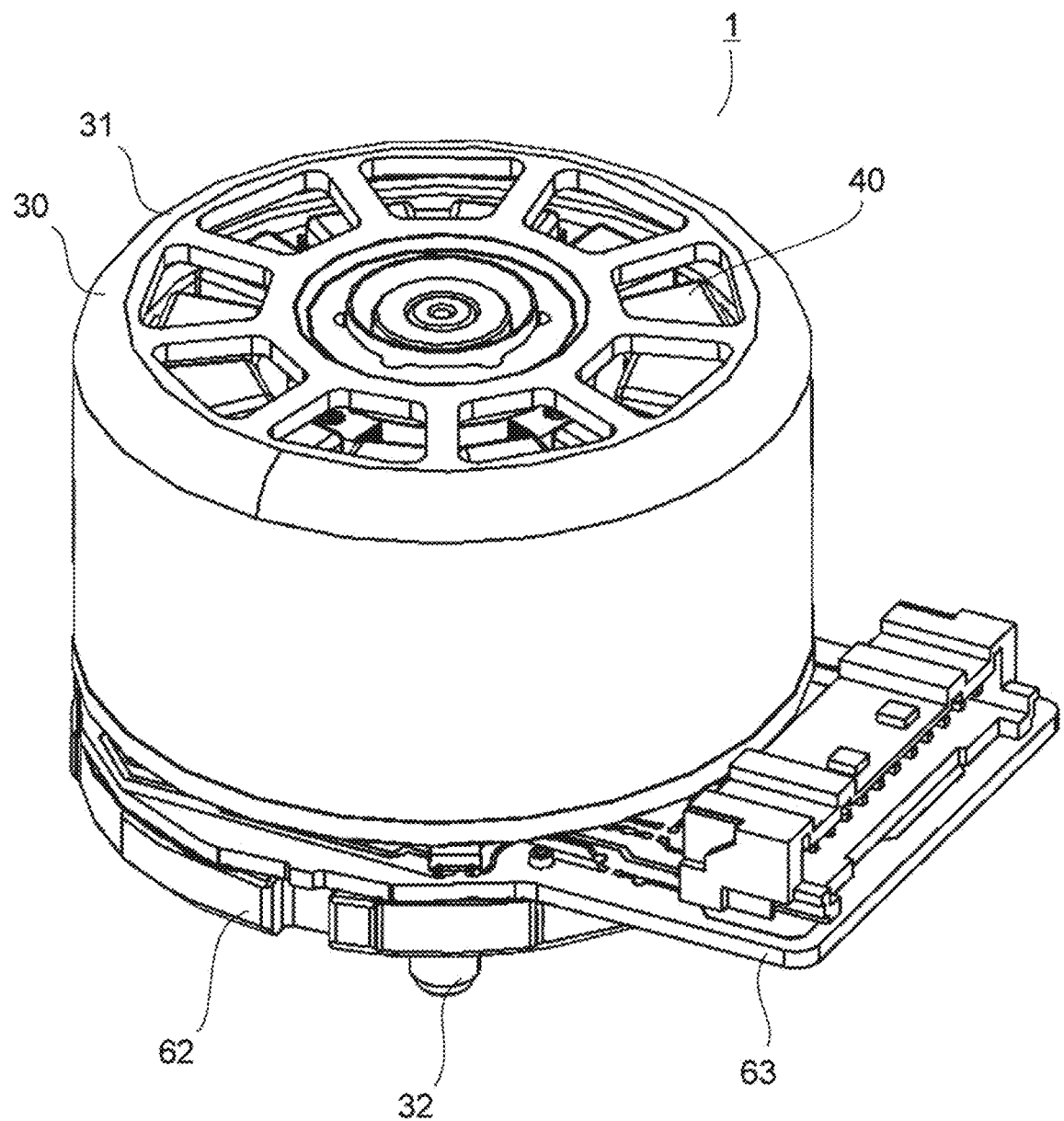
FIG. 1 is a perspective view of a motor of an example embodiment of the present disclosure.
Figure 2:
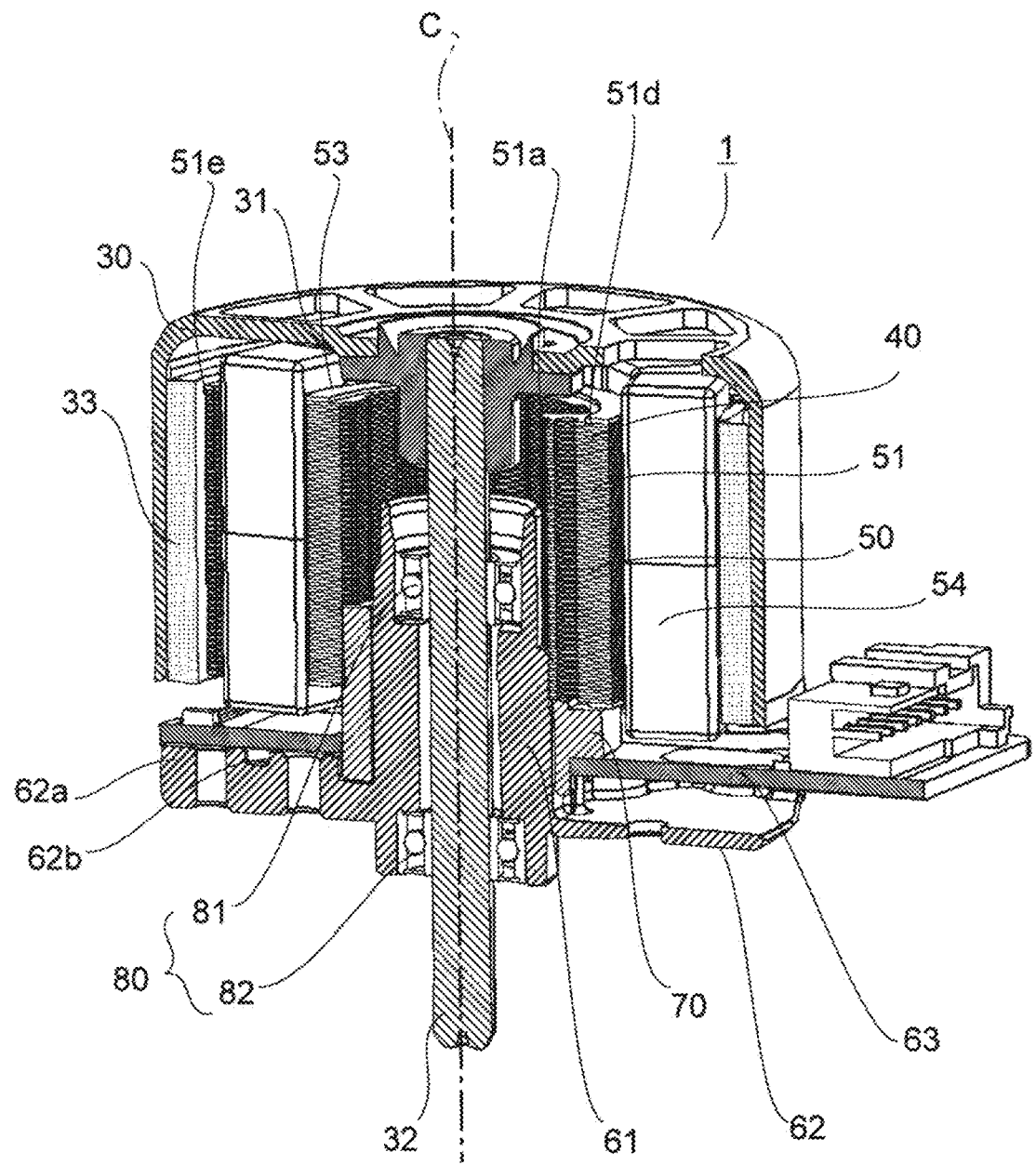
FIG. 2 is a perspective longitudinal section of a motor of an example embodiment of the present disclosure.
Figure 3:
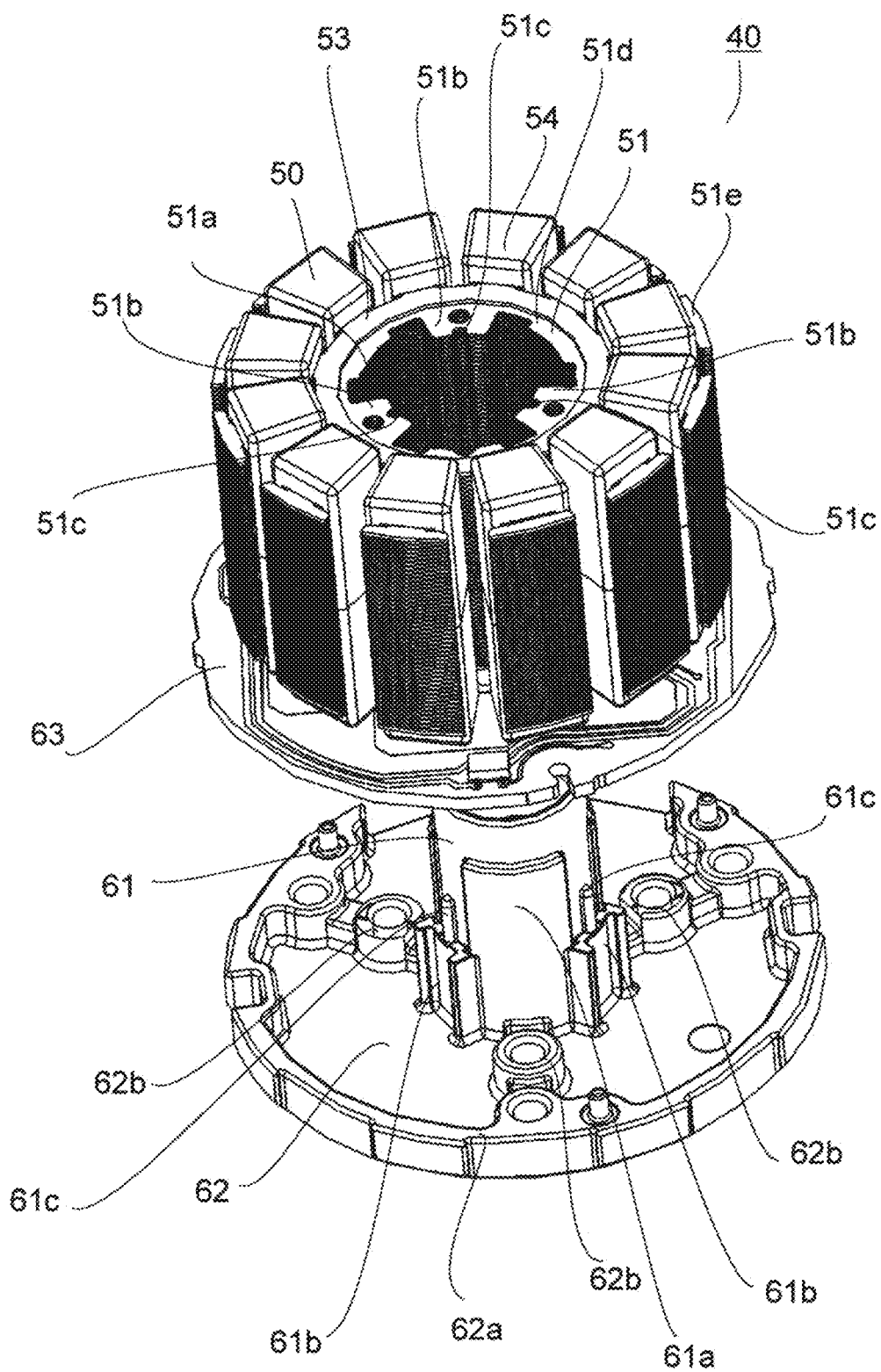
FIG. 3 is an exploded perspective view of a stationary portion of a motor of an example embodiment of the present disclosure.
Figure 4:
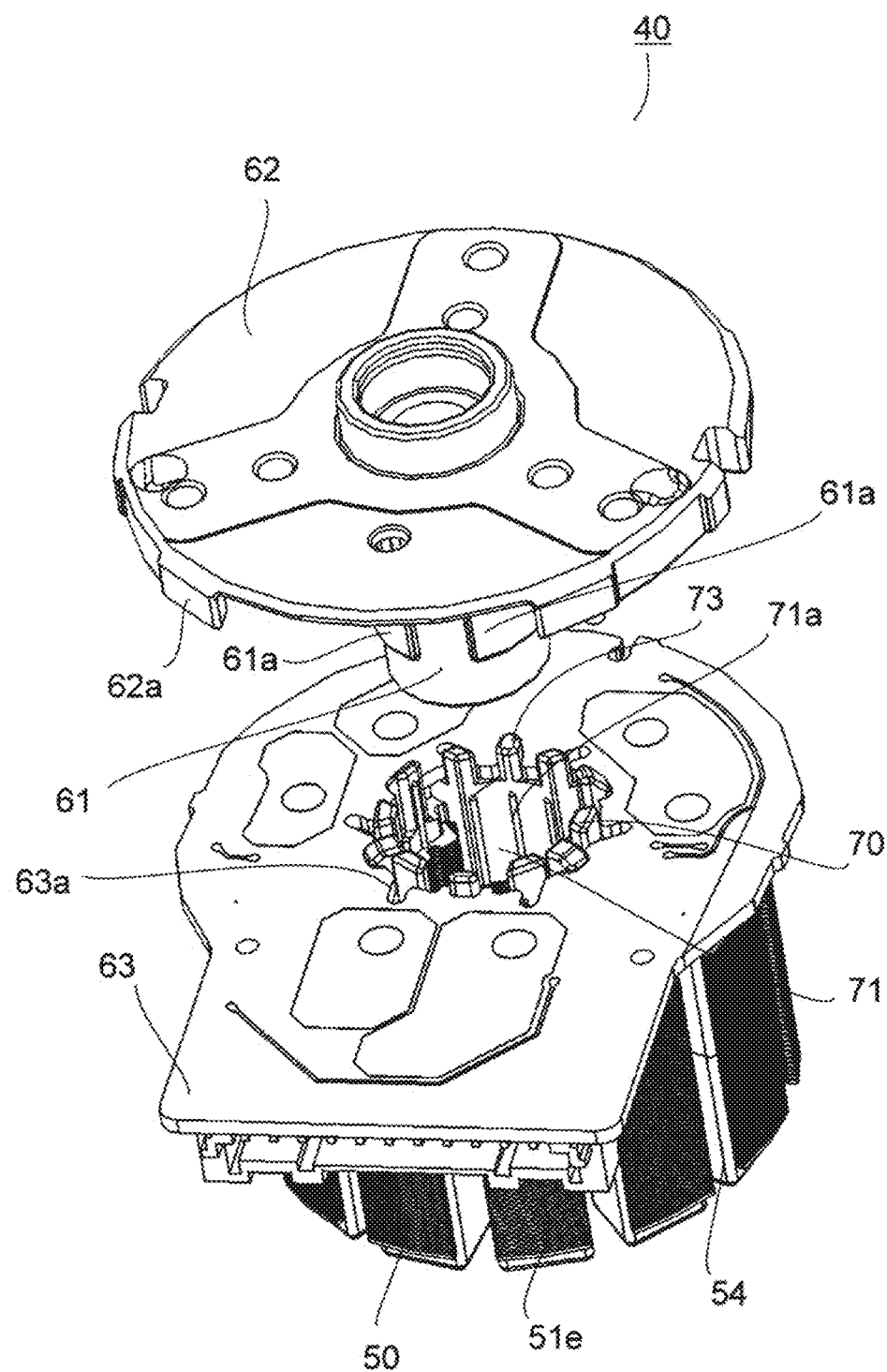
FIG. 4 is an exploded perspective view of a stationary portion of a motor of an example embodiment of the present disclosure as viewed from below.

A motor of the exemplary example embodiment of the present disclosure will be described. FIGS. 1 and 2 are a perspective view and a perspective longitudinal section of a motor 1 of the example embodiment of the present disclosure. FIG. 3 is an exploded perspective view of a stationary portion 40 of the motor 1, and FIG. 4 is an exploded perspective view of the stationary portion 40 of the motor 1 as viewed from below.

The motor 1 has a rotating portion 30, a stationary portion 40, and a bearing portion 80. The rotating portion 30 has a shaft 32 that rotates about a vertically extending central axis C. The bearing portion 80 rotatably supports the shaft 32 with respect to the stationary portion 40.

The stationary portion 40 includes a stator 50, a bearing housing portion 61, a circuit board 63, and a spacer 70. In the example embodiment, the stationary portion 40 further includes a base portion 62.

The stator 50 has a stator core 51, an insulating film 53, and a coil 54. The stator core 51 is formed of an annular laminated steel plate having an insertion hole 51a around the central axis C.

The stator 50 is disposed radially outward of the bearing housing portion 61. That is, the stator 50 is disposed radially outward of the bearing housing portion 61 and has the stator core 51. The stator core 51 has multiple stator protrusions 51b protruding radially inward from a radially inner surface thereof. In the example embodiment, the stator protrusions 51b are provided in three locations and arranged at equal intervals in the circumferential direction. Further, a groove 51c extending in the axial direction is formed on a radially inner surface of the stator protrusion 51b. The stator protrusions 51b do not necessarily have to be provided in three locations in the circumferential direction, and may be provided in two, four, or more locations.

The stator core 51 has an annular core back 51d and multiple teeth 51e arranged in the circumferential direction. The teeth 51e extend radially outward from the core back 51d.

The insulating film 53 is applied to upper, lower, and circumferential side surfaces of the teeth 51e to cover the surface of the teeth 51e. The insulating film 53 extends radially inward from the upper and lower surfaces of the teeth 51e to cover the upper and lower outer edge portions of the core back 51d. That is, the insulating film 53 covers the surface of the teeth 51e, extends radially inward from the lower surface of the teeth 51e, and covers the lower outer edge portion of the core back 51d.

The coil 54 is formed in the teeth 51e. More specifically, the coil 54 is formed by winding a conductor wire (not shown) around the teeth 51e with the insulating film 53 interposed therebetween. The multiple circumferentially arranged coils 54 are connected in series through a connecting wire (not shown). The connecting wire passes over the insulating film 53 covering the upper outer edge or lower outer edge of the core back 51d. Also, the conductor wire is drawn out from the lower surface of the stator core 51 and is electrically connected to the circuit board 63. That is, the circuit board 63 is disposed below the stator 50. In other words, the circuit board 63 is disposed below the stator core 51.

The circuit board 63 has a through hole 63a through which the bearing housing portion 61 passes. The through hole 63a is disposed below the stator core 51. The circuit board 63 is engaged with engagement claws 73, 74 of the spacer 70. For this reason, the circuit board 63 is positioned with respect to the stator core 51 before the bearing housing portion 61 is press-fitted into the stator core 51 (see FIG. 4). Hence, when a connection portion (not shown) of the circuit board 63 and the conductor wire are soldered, the circuit board 63 can be prevented from being fixed to the stator core 51 in a tilted state. In addition, the connection portion (not shown) and the conductor wire can be positioned easily, to improve workability of soldering.

The spacer 70 has an annular shape disposed between the stator 50 and the bearing housing portion 61. More specifically, the spacer 70 has an annular shape disposed between the stator core 51 and the bearing housing portion 61. The configuration of the spacer 70 will be described in detail later. In the example embodiment, the spacer 70 is a resin molded product. With the spacer 70 inserted and fitted into the insertion hole 51a of the stator core 51, the bearing housing portion 61 is press-fitted into the stator core 51.

Note that while the spacer 70 may be formed of a metal material (e.g., aluminum), a resin molded product is cheaper and more easily deforms elastically than a metal molded product. For this reason, a resin molded product is more preferable in terms of excellent fixing to the stator core 51 and the bearing housing portion 61.

The bearing housing portion 61 is formed in a cylindrical shape with open upper and lower surfaces, and fits with the stator core 51. The bearing housing portion 61 holds the bearing portion 80 on the inner side thereof. That is, the bearing housing portion 61 has a cylindrical shape that holds the bearing portion 80. The bearing portion 80 has an upper bearing portion 81 and a lower bearing portion 82 disposed below the upper bearing portion 81. The upper bearing portion 81 and the lower bearing portion 82 are fitted and fixed to an inner peripheral surface of the bearing housing portion 61. A ball bearing is used as the upper bearing portion 81 and the lower bearing portion 82, for example.

The bearing housing portion 61 has a housing protrusion 61a that protrudes radially outward from a radially outer surface thereof. Further, the bearing housing portion 61 has a support portion 61b and a rib 61c. The housing protrusions 61a are provided in three locations, and are arranged at equal intervals in the circumferential direction. The housing protrusion 61a comes into contact with a radially inner surface of the spacer 70.

The support portions 61b are disposed between adjacent housing protrusions 61a, and are provided in three locations. The support portion 61b protrudes radially outward more than the housing protrusion 61a. Moreover, the upper end of the support portion 61b is disposed below the upper end of the housing protrusion 61a. An upper surface of the support portion 61b comes into contact with a lower inner edge portion of the stator protrusion 51b. Thus, the stator core 51 is axially positioned with respect to the bearing housing portion 61.

The rib 61c extends axially upward from the upper end of the support portion 61b. The rib 61c fits in the groove 51c formed in the stator protrusion 51b.

The base portion 62 spreads radially from a lower portion of the bearing housing portion 61. In the example embodiment, the base portion 62 is formed in a disc shape orthogonal to the axial direction. The bearing housing portion 61 and the base portion 62 are integrally molded by casting. The bearing housing portion 61 and the base portion 62 may be molded separately. For example, an insertion hole subjected to burring may be provided in the base portion 62 to press-fit and fix the bearing housing portion 61 thereto.

The base portion 62 has base projections 62a, 62b protruding upward from an upper surface thereof. The base projection 62a is disposed in an outer peripheral portion of the base portion 62 and is formed in an annular shape. The base projection 62b extends radially from the radially outer surface of the bearing housing portion 61. That is, the stationary portion 40 has the base portion 62 that spreads radially from the lower portion of the bearing housing portion 61. The upper ends of the base projection 62a and the base projection 62b are at the same height, and are located below the upper end of the support portion 61b. The base projections 62a, 62b come into contact with a lower surface of the circuit board 63.

The rotating portion 30 includes a rotor holder 31, the shaft 32, and a magnet 33. The shaft 32 is a columnar metal member that forms a rotating shaft extending along the central axis C, and is inserted into the bearing housing portion 61.

The shaft 32 is supported by the upper bearing portion 81 and the lower bearing portion 82 so as to be rotatable about the central axis C. Further, an upper end portion of the shaft 32 is connected to the rotor holder 31. The shaft 32 protrudes below the lower end of the bearing housing portion 61. A lower end portion of the shaft 32 protrudes below the lower end of the bearing housing portion 61 and is connected to a device to be driven.

The rotor holder 31 has a cylindrical shape with a lid, and the magnet 33 is fixed to an inner peripheral surface thereof. The magnet 33 is disposed radially outward of the coil 54, and a torque is generated between the stator 50 and the magnet 33 when the motor 1 is driven.

Figure 5:
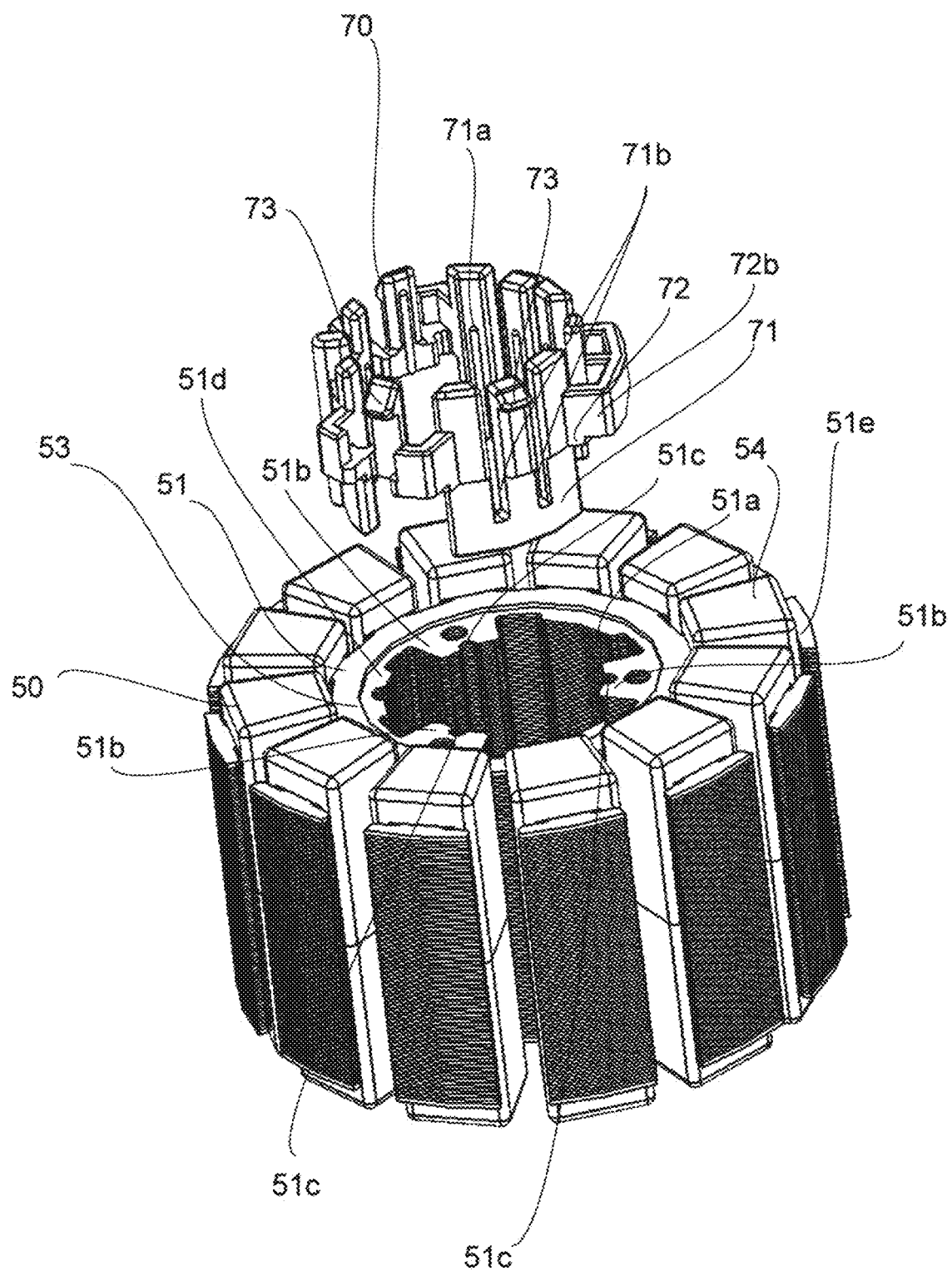
FIG. 5 is a perspective view of a stator of a motor of an example embodiment of the present disclosure as viewed from below.
Figure 6:
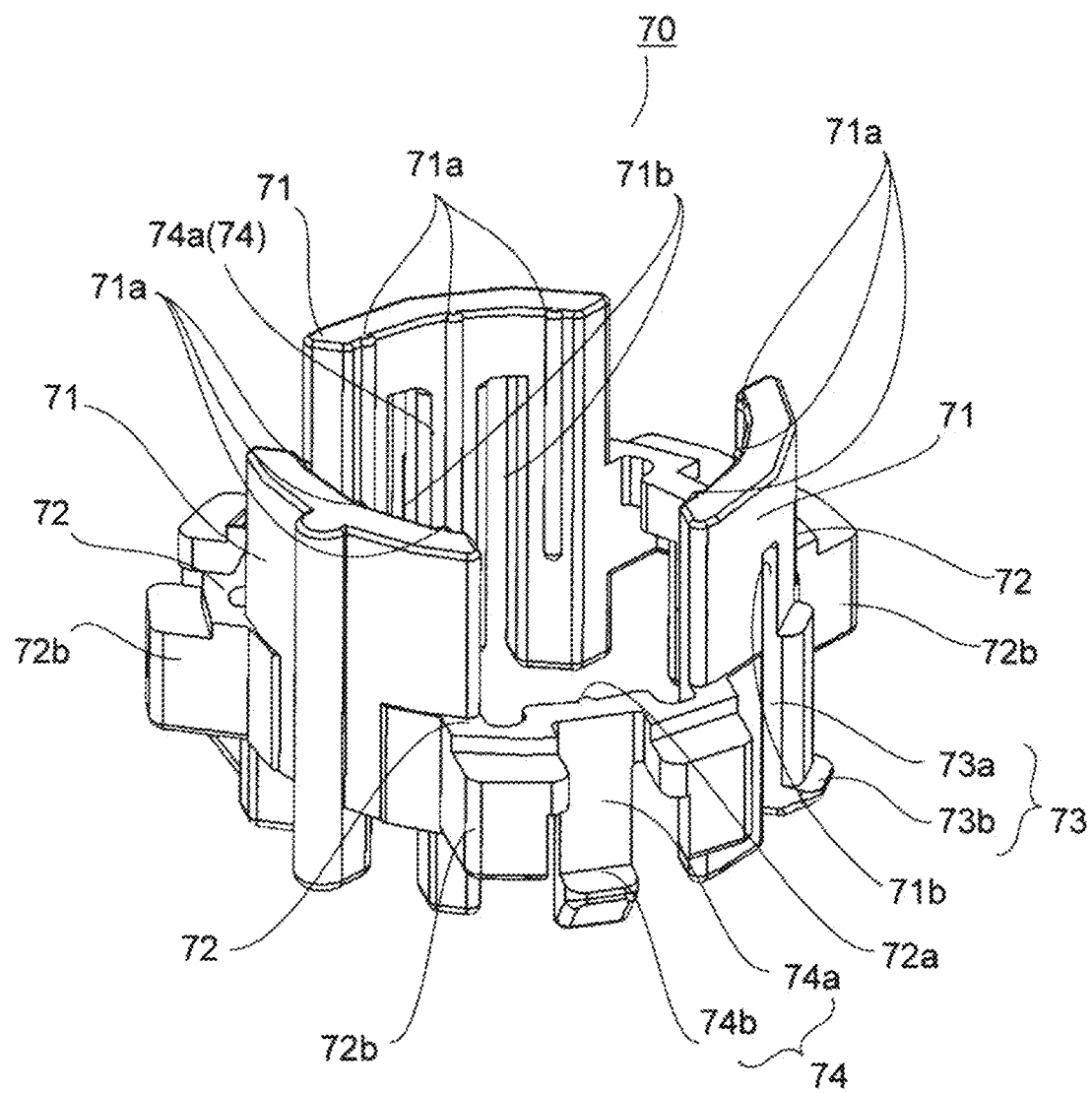
FIG. 6 is a perspective view of a spacer of a motor of an example embodiment of the present disclosure.
Figure 7:
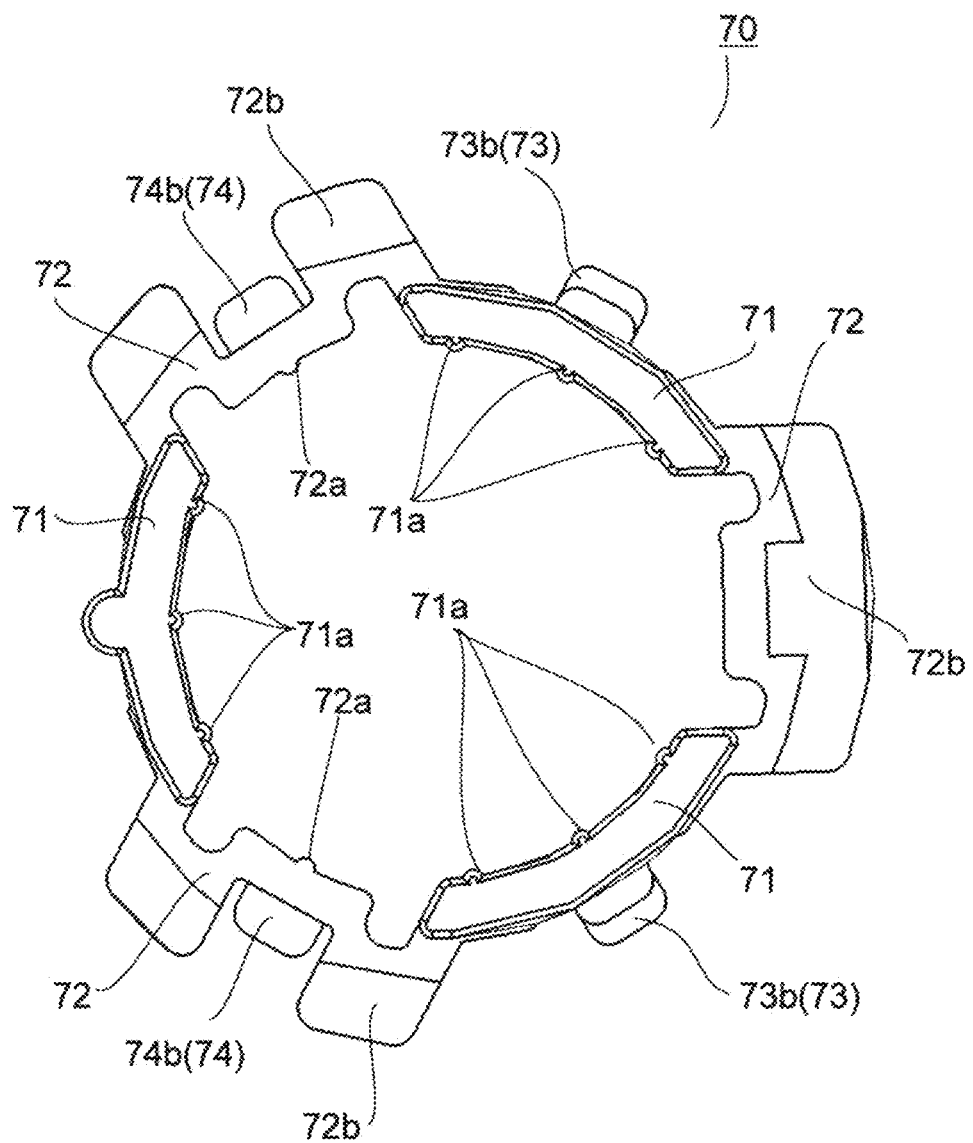
FIG. 7 is a plan view of a spacer of a motor of an example embodiment of the present disclosure.

FIG. 5 is a perspective view of the stator 50 as viewed from below, and shows a state before the spacer 70 is inserted and fitted to the insertion hole 51a. FIGS. 6 and 7 are a perspective view and a plan view of the spacer 70. The spacer 70 has a side wall portion 71 and a flange portion 72. In the example embodiment, the spacer 70 further includes the engagement claws 73, 74. The side wall portions 71 and the flange portions 72 are alternately arranged adjacent to each other in the circumferential direction.

A radially outer surface of the side wall portion 71 is curved along the radially inner surface of the stator core 51, and is formed in a circular arc shape in top view. The upper end of the side wall portion 71 is located above the upper end of the flange portion 72. The side wall portion 71 is axially inserted between the adjacent stator protrusions 51b. In other words, the stator core 51 has the stator protrusion 51b that protrudes to a space between the side wall portions 71 from the radially inner surface of the stator core 51. The multiple side wall portions 71 come into contact with the radially inner surface of the stator core 51. More specifically, the multiple side wall portions 71 come into contact with the radially inner surface of the stator core 51 and the radially outer surface of the bearing housing portion 61 (see FIG. 4).

The flange portion 72 protrudes radially outward more than the side wall portion 71. The flange portion 72 comes into contact with the lower surface of the stator core 51. More specifically, an upper surface of the flange portion 72 comes into contact with the lower surface of the stator protrusion 51b. That is, the flange portion 72 comes into contact with a lower inner edge portion of the core back 51d while avoiding the insulating film 53 (see FIG. 9). As a result, the spacer 70 and the stator core 51 are in stable contact in the axial direction, and rattling of the spacer 70 can be suppressed. Furthermore, the spacer 70 and the stator core 51 can be fixed firmly. Accordingly, the stator core 51 and the bearing housing portion 61 can be fixed firmly. Further, since the flange portion 72 comes into contact with the lower surface of the stator core 51, the spacer 70 can be easily positioned in the axial direction.

Further, the side wall portion 71 in contact with the bearing housing portion 61 is more likely to be deformed than the flange portion 72. However, the side wall portion 71 and the flange portion 72 are disposed adjacent to each other in the circumferential direction, and the flange portion 72 is not easily affected by the deformation of the side wall portion 71. Accordingly, even when the side wall portion 71 is deformed, the distance between the flange portion 72 and the insulating film 53 can be maintained appropriately.

The flange portion 72 has a flange projection 72b that protrudes radially outward. The upper surface of the flange portion 72 has a descending step above the flange projection 72b. Hence, when the upper surface of the flange portion 72 is in contact with the lower surface of the stator protrusion 51b, a gap is formed between the two. More specifically, a gap (not shown) is formed between an upper surface of the flange projection 72b and the lower surface of the stator 50.

The flange projection 72b can improve the strength of the spacer 70 by increasing the amount of radial protrusion of the spacer 70. For this reason, the thickness of the flange portion 72 can be reduced on the inner side in the radial direction of the flange projection 72b. Thus, by disposing the flange portion 72 and the insulating film 53 further apart, the flange portion 72 and the insulating film 53 can be disposed with an appropriate distance interposed therebetween.

The engagement claws 73, 74 are snap-fit type claws, and engage with the through hole 63a of the circuit board 63. More specifically, the spacer 70 has the engagement claw 73 that protrudes downward and engages with the periphery of the through hole 63a. Two engagement claws 73 are provided, and are each disposed below the side wall portion 71. Two engagement claws 74 are provided, and are each disposed below the flange portion 72.

The engagement claws 73, 74 have standing portions 73a, 74a and engagement projections 73b, 74b. The standing portions 73a, 74a extend downward. More specifically, the standing portion 73a extends downward from the side wall portion 71. The standing portion 74a extends downward from the flange portion 72. The engagement projections 73b, 74b protrude radially outward from lower end portions of the standing portions 73a, 74a. The standing portions 73a, 74a warp in the radial direction, and the engagement projections 73b, 74b engage with the periphery of the through hole 63a of the circuit board 63. That is, the engagement projections 73b, 74b engage with the through hole 63a.

A pair of slits 71b which extend in the axial direction and have open lower ends are formed in the side wall portion 71. An upper portion of the standing portion 73a is formed between the slits 71b. Hence, the standing portion 73a is formed longer in the axial direction, and warps easily in the radial direction. Accordingly, the workability of engaging the engagement claw 73 with the through hole 63a is improved.

The spacer 70 has spacer protrusions 71a, 72a. That is, the spacer 70 has the multiple side wall portions 71 and flange portions 72, and the multiple spacer protrusions 71a, 72a. The spacer protrusions 71a, 72a protrude radially inward from a radially inner surface of the side wall portion 71 or the flange portion 72, and are juxtaposed in the circumferential direction. In the example embodiment, multiple spacer protrusions 71a, 72a are provided on the radially inner surface of the side wall portion 71 and the flange portion 72 so as to protrude radially inward and be juxtaposed in the circumferential direction. The spacer protrusions 71a, 72a extend linearly in the axial direction. The spacer protrusions 71a are disposed in three locations on the radially inner surface of each of the side wall portions 71. The spacer protrusion 72a is disposed in a single location on the radially inner surface of each of two flange portions 72. In the example embodiment, the spacer protrusion 72a is not provided in one flange 72. However, the spacer protrusion 72a may be provided in all of the flange portions 72.

Figure 8:
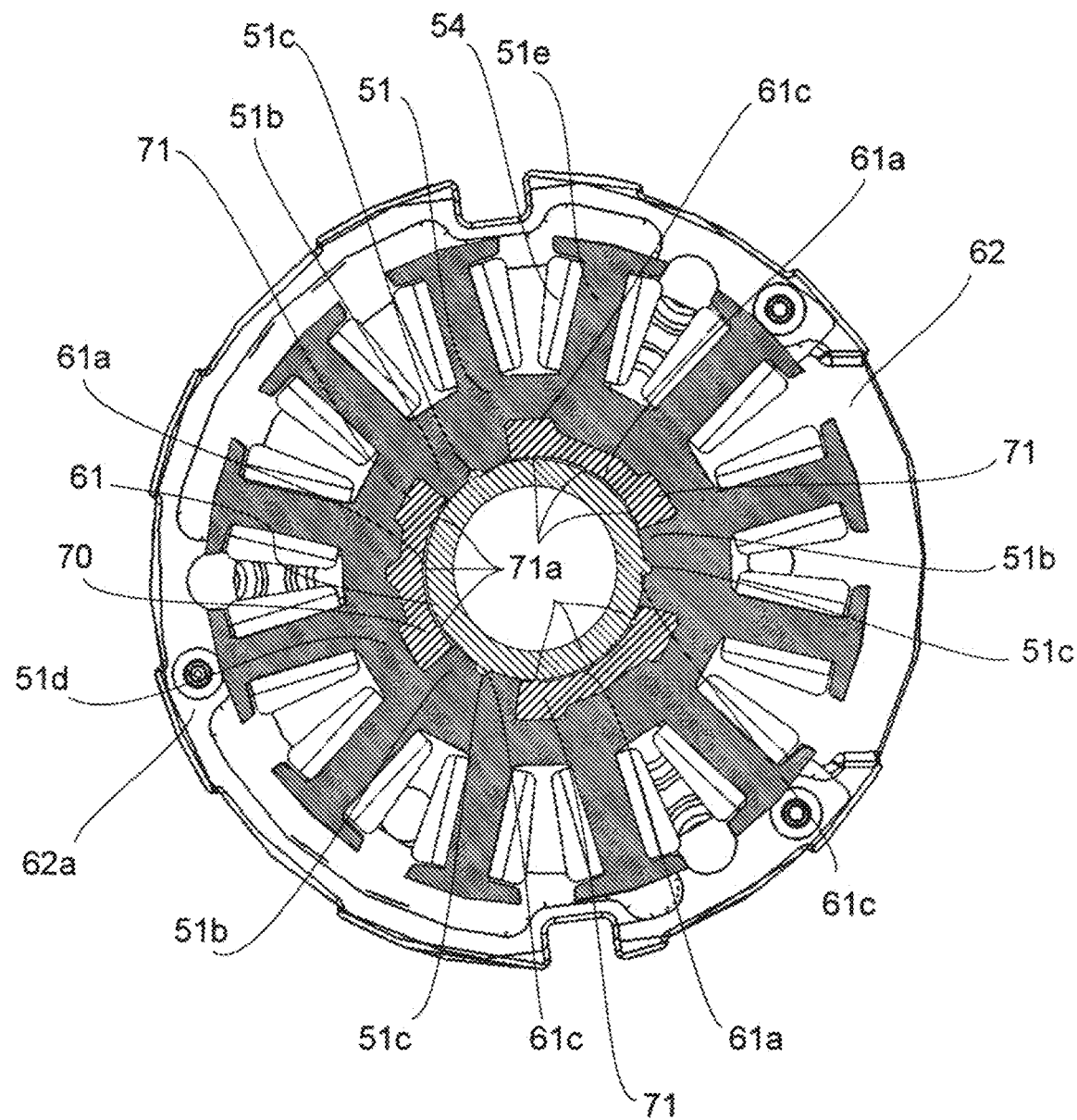
FIG. 8 is a cross-sectional view of a motor of an example embodiment of the present disclosure as viewed from above.

FIG. 8 is a cross-sectional view of the motor 1 as viewed from above, and shows a press-fit structure of the bearing housing portion 61 and the stator core 51.

When the bearing housing portion 61 is press-fitted into the stator core 51, the spacer protrusions 71a, 72a (spacer protrusion 72a not shown in FIG. 8) are in close contact with radially outer surfaces of the housing protrusions 61a. That is, the housing protrusion 61a and the spacer protrusion 72a come into contact with each other. That is, the spacer protrusions 71a, 72a come into contact with the radially outer surface of the bearing housing portion 61. As a result, the stator core 51 and the bearing housing portion 61 can be fixed firmly. In addition, rattling and vibration of the spacer 70 can be suppressed. Further, since the housing protrusions 61a are provided in the bearing housing portion 61, the spacer protrusions 71a, 72a can be reliably brought into contact with the radially outer surface of the bearing housing portion 61.

Further, the rib 61c is fitted in the groove 51c, and the bearing housing portion 61 is lightly press-fitted into the stator protrusion 51b. That is, the bearing housing portion 61 is press-fitted into the stator protrusion 51b. At this time, the stator protrusion 51b comes into contact with the radially outer surface of the bearing housing portion 61. As a result, the stator core 51 and the bearing housing portion 61 can be fixed more firmly.

Further, multiple stator protrusions 51b are arranged at equal intervals in the circumferential direction. With this configuration, radial stress that the bearing housing portion 61 receives from the stator protrusions 51b is substantially uniform. Thus, the stator core 51 and the bearing housing portion 61 can be fixed more firmly while suppressing application of strong stress to a specific region of the bearing housing portion 61.

In the present example embodiment, the spacer protrusions 71a, 72a are not arranged at equal intervals in the circumferential direction. However, the spacer protrusions 71a, 72a may be arranged at equal intervals in the circumferential direction. In this case, radial stress that the bearing housing portion 61 receives from the spacer protrusions 71a, 72a can be made substantially uniform. Thus, rattling and vibration of the spacer 70 can be further suppressed.

Further, the spacer protrusions 71a, 72a extend linearly in the axial direction. Hence, when the bearing housing portion is axially inserted into the stator core 51, the spacer protrusions 71a, 72a deform easily. As a result, the bearing housing portion 61 can be easily press-fitted into the stator core 51.

Further, the lower ends of the spacer protrusions 71a, 72a are disposed above the upper end of the lower bearing portion 82. This can keep the radial stress that the bearing housing portion 61 receives from the spacer protrusions 71a, 72a from acting strongly on the lower bearing portion 82.

Figure 9:
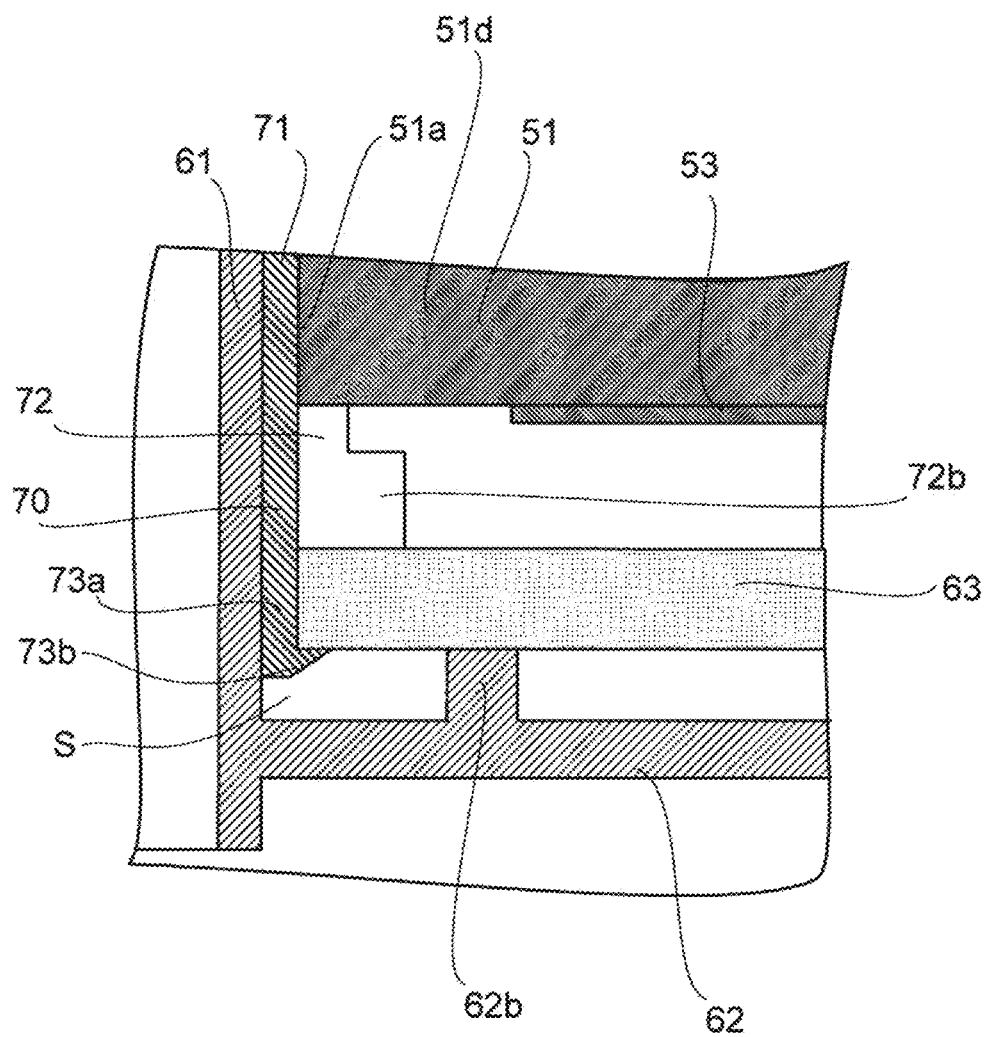
FIG. 9 is an enlarged longitudinal section showing a mounting structure of a circuit board of a motor of an example embodiment of the present disclosure.

FIG. 9 is an enlarged longitudinal section showing the mounting structure of the circuit board 63. The stator core 51 is axially positioned with the stator protrusion 51b brought into contact with the upper surface of the support portion 61b (see FIG. 3). The circuit board 63 is axially sandwiched between upper surfaces of the base projections 62a, 62b (see FIG. 3) and lower surfaces of the flange portions 72 and the flange projections 72b. That is, the circuit board 63 is sandwiched between the base projections 62a, 62b protruding upward from the upper surface of the base portion 62, and the flange portions 72. At this time, the upper surface of the flange portion 72 comes into contact with the stator core 51. Further, the lower ends of the engagement claws 73, 74 (lower end of spacer 70) and the upper surface of the base portion 62 face each other in the axial direction with a gap S interposed therebetween. That is, the lower end of the spacer 70 and the upper surface of the base portion 62 face each other in the axial direction with the gap S interposed therebetween.

Accordingly, the circuit board 63 is sandwiched and fixed between the stator core 51 and the base portion 62 through the flange portion 72 and the flange projection 72b. Further, the lower surface of the flange projection 72b is in contact with the upper surface of the circuit board 63. As a result, the circuit board 63 is fixed more stably. With this configuration, vibration of the circuit board 63 can be further reduced.

The above example embodiment is merely an example of the present disclosure. The configuration of the example embodiment may be modified as appropriate without departing from the technical concept of the present disclosure. Also, example embodiments may be implemented in appropriate combinations.

In the above example embodiment, the flange portion 72 is disposed adjacent to the side wall portion 71 in the circumferential direction. However, the present disclosure is not limited to this, and a flange portion may protrude radially outward from the radially outer surface of the side wall portion 71.

The motor of the present invention is applicable to, for example, a robot.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a stationary portion;
   a rotating portion that includes a shaft rotatable about a vertically extending central axis; and
   a bearing portion that rotatably supports the shaft with respect to the stationary portion; wherein
   the stationary portion includes:
      a cylindrical bearing housing portion that holds the bearing portion;
      a stator that is radially outward of the bearing housing portion;
      a circuit board that is below the stator; and
      an annular spacer that is between the stator and the bearing housing portion;
   the stator includes:
      a stator core that includes an annular core back and a plurality of teeth that extend radially outward from the core back and are arranged in a circumferential direction;
      an insulating film that covers a surface of the teeth, extends radially inward from a lower surface of the teeth, and covers a lower outer edge portion of the core back; and
      a coil provided on the teeth; and
   the spacer includes:
      a plurality of side wall portions that contact a radially inner surface of the stator core and a radially outer surface of the bearing housing portion; and
      a flange portion that protrudes radially outward more than the side wall portion, and contacts a lower inner edge portion of the core back and avoids the insulating film.

2. The motor according to claim 1, wherein
   the flange portion includes a flange projection that protrudes radially outward; and
   a gap is provided between an upper surface of the flange projection and a lower surface of the stator.

3. The motor according to claim 1, wherein a lower surface of a flange projection and an upper surface of the circuit board come into contact with each other.

4. The motor according to claim 1, wherein
the circuit board includes a through hole through which the bearing housing portion passes; and
the spacer includes an engagement claw that protrudes downward and engages with a periphery of the through hole.

5. The motor according to claim 4, wherein
the engagement claw includes a standing portion extending downward, and an engagement projection protruding radially outward from a lower end portion of the standing portion; and
the engagement projection engages with the through hole.

6. The motor according to claim 1, wherein
the stationary portion includes a base portion that extends radially from a lower portion of the bearing housing portion;
the circuit board is sandwiched between a base projection protruding from an upper surface of the base portion, and the flange portion; and
a lower end of the spacer and an upper surface of the base portion face each other in an axial direction with a gap interposed therebetween.

7. The motor according to claim 1, wherein
the stator core includes a stator protrusion that protrudes to a space between the side wall portions from a radially inner surface of the stator core; and
the stator protrusion contacts a radially outer surface of the bearing housing portion.

8. The motor according to claim 7, wherein the bearing housing portion is press-fitted into the stator protrusion.

9. The motor according to claim 7, wherein a plurality of stator protrusions are arranged at equal or substantially equal intervals in the circumferential direction.

10. The motor according to claim 1, wherein the side wall portion and the flange portion are alternately arranged adjacent to each other in the circumferential direction.

11. The motor according to claim 7, wherein an upper surface of the flange portion contacts a lower surface of the stator protrusion.

* * * * *